United States Patent
Tsuchinaga et al.

(10) Patent No.: US 8,768,071 B2
(45) Date of Patent: Jul. 1, 2014

(54) OBJECT CATEGORY RECOGNITION METHODS AND ROBOTS UTILIZING THE SAME

(75) Inventors: Masayoshi Tsuchinaga, Miyoshi (JP); Mario Fritz, Saarbrücken (DE); Trevor Darrell, Berkeley, CA (US)

(73) Assignees: Toyota Motor Engineering & Manufacturing North America, Inc., Erlanger, KY (US); International Computer Science Institute, Berkeley, CA (US)

( * ) Notice: Subject to any disclaimer, the term of this patent is extended or adjusted under 35 U.S.C. 154(b) by 342 days.

(21) Appl. No.: 13/196,249

(22) Filed: Aug. 2, 2011

(65) Prior Publication Data
US 2013/0034295 A1 Feb. 7, 2013

(51) Int. Cl.
*G06K 9/68* (2006.01)
*G06K 9/62* (2006.01)

(52) U.S. Cl.
USPC ............... 382/227; 382/226; 382/228

(58) Field of Classification Search
CPC .................................. G06K 9/6282
USPC ................................ 382/224–228
See application file for complete search history.

(56) References Cited

U.S. PATENT DOCUMENTS

| | | | |
|---|---|---|---|
| 6,816,755 B2 | 11/2004 | Habibi et al. | |
| 7,031,530 B2 * | 4/2006 | Driggs et al. | 382/228 |
| 7,280,697 B2 | 10/2007 | Perona et al. | |
| 7,305,122 B2 * | 12/2007 | Ii et al. | 382/159 |
| 7,328,196 B2 | 2/2008 | Peters, II | |
| 8,024,188 B2 * | 9/2011 | Hu et al. | 704/240 |
| 8,275,726 B2 * | 9/2012 | Tsaparas et al. | 706/20 |
| 8,442,926 B2 * | 5/2013 | Kato et al. | 706/20 |
| 8,498,984 B1 * | 7/2013 | Hwang et al. | 707/731 |
| 2004/0148170 A1 * | 7/2004 | Acero et al. | 704/257 |
| 2005/0047647 A1 | 3/2005 | Rutishauser et al. | |
| 2005/0185835 A1 | 8/2005 | Matsugu et al. | |
| 2006/0253423 A1 * | 11/2006 | McLane et al. | 707/2 |
| 2007/0058836 A1 * | 3/2007 | Boregowda et al. | 382/103 |
| 2008/0199084 A1 * | 8/2008 | Kasahara | 382/224 |
| 2008/0243305 A1 | 10/2008 | Lee et al. | |
| 2008/0312904 A1 * | 12/2008 | Balchandran et al. | 704/9 |
| 2009/0018696 A1 | 1/2009 | Goerick et al. | |

(Continued)

OTHER PUBLICATIONS

Saenko et al., "Adapting visual category models to new domains", ECCV 2010, Lecture Notes in Computer Science vol. 6314, 2010, pp. 213-226.*

(Continued)

*Primary Examiner* — Anand Bhatnagar
*Assistant Examiner* — Soo Park
(74) *Attorney, Agent, or Firm* — Dinsmore & Shohl LLP

(57) ABSTRACT

Methods for recognizing a category of an object are disclosed. In one embodiment, a method includes determining, by a processor, a preliminary category of a target object, the preliminary category having a confidence score associated therewith, and comparing the confidence score to a learning threshold. If the highest confidence score is less than the learning threshold, the method further includes estimating properties of the target object and generating a property score for one or more estimated properties, and searching a supplemental image collection for supplemental image data using the preliminary category and the one or more estimated properties. Robots programmed to recognize a category of an object by use of supplemental image data are also disclosed.

20 Claims, 5 Drawing Sheets

(56) References Cited

U.S. PATENT DOCUMENTS

| | | | |
|---|---|---|---|
| 2009/0030345 A1 | 1/2009 | Bonnet et al. | |
| 2009/0094178 A1* | 4/2009 | Aoki | 706/20 |
| 2010/0245564 A1 | 9/2010 | Nam et al. | |
| 2010/0262286 A1 | 10/2010 | Eidenberger et al. | |
| 2011/0110560 A1* | 5/2011 | Adhikari | 382/103 |
| 2011/0123071 A1* | 5/2011 | Shah et al. | 382/118 |
| 2011/0251989 A1* | 10/2011 | Kraaij et al. | 706/50 |

OTHER PUBLICATIONS

Ashish Kapoor (Microsoft Research, Redmond, WA), Kristen Grauman (Univ. of Texas at Austin, Austin, TX), Raquel Urtasun and Trevor Darrell (MIT CSAIL, Cambridge, MA), "Active Learning With Gaussian Processes for Object Categorization", ICCV 2007, Oct. 14-21, 2007.

* cited by examiner

OBJECT CATEGORY RECOGNITION METHODS AND ROBOTS UTILIZING THE SAME

TECHNICAL FIELD

The present disclosure generally relates to object category recognition and, more particularly, object category recognition methods utilizing supplemental image data, and robots utilizing such object category recognition methods.

BACKGROUND

Robots may operate within a space to perform particular tasks. For example, robots may be deployed in factories, homes, offices, and healthcare facilities, among others. Servant robots may be tasked with navigating within the operating space, locating objects, and manipulating objects. For example, a robot may be commanded to find an object within the operating space, pick up the object, and move the object to a different location within the operating space.

Robots commonly utilize a vision-based object recognition method to recognize objects within the operating space for navigation, and to find and manipulate objects. Prior to manipulating an object, the robot will ideally recognize that the target object is the type of object that it should manipulate. Object recognition methods such as edge detection, corner detection, feature extraction, and others may be used to recognize objects within the operating space. Object recognition methods may also be used outside of the robotics and vision system fields. For example, object recognition methods may be used to categorize images into a categorization system. Object recognition methods may compare data or features of an image under consideration to data or features of reference images stored in a library. When a correlation between the data or features of the image under consideration and the data or features of a reference image(s) is found, the image under consideration may be categorized in a category corresponding to the reference image(s). However, the library may have insufficient data regarding particular types or categories of objects such that the robot (or object recognition system) cannot categorize a target object or image under consideration with a high degree of confidence.

Accordingly, a need exists for alternative methods for recognizing a category of an object and robots utilizing the same.

SUMMARY

In one embodiment, a method for recognizing a category of an object includes determining, by a processor, a preliminary category of a target object, the preliminary category having a confidence score associated therewith, and comparing the confidence score to a learning threshold. If the highest confidence score is less than the learning threshold, the method further includes estimating properties of the target object, generating a property score for one or more estimated properties, and searching a supplemental image collection for supplemental image data using the preliminary category and the one or more estimated properties.

In another embodiment, a method for recognizing a category of an object includes determining, by a processor, a preliminary category of a target object. The preliminary category has a confidence score that is determined by obtaining target image data of the target object, extracting a set of features from the target image data, comparing the extracted set of features to library features associated with a plurality of categories of an image library stored in a database, and generating the confidence score for one or more categories of the plurality of categories. The category having a highest confidence score may be selected as the preliminary category of the target object. The method further includes comparing the confidence score to a learning threshold, and, if the highest confidence score is less than the learning threshold, estimating properties of the target object and generating a property score for one or more estimated properties. The property score for the one or more estimated properties may be compared with an estimated property threshold, and a search query may be generated based at least in part on the preliminary category and the one or more estimated properties having a property score that is greater than the estimated property threshold. The method further includes searching the supplemental image collection for supplemental image data using the search query, and supplementing the image library with retrieved supplemental image data.

In yet another embodiment, a robot includes an image capturing device, a processor, and a computer-readable storage medium comprising instructions that, when executed by the processor, causes the processor to control the image capturing device to acquire target image data of a target object, determine a preliminary category of a target object, the preliminary category having a confidence score associated therewith, and compare the confidence score to a learning threshold. If the highest confidence score is less than the learning threshold, properties of the target object are estimated and a property score for one or more estimated properties is generated. The set of instructions further cause the processor to search a supplemental image collection for supplemental image data using the preliminary category and the one or more estimated properties.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Embodiments of the present disclosure are directed to methods and robots for recognizing a category of a target object. The methods described herein may be performed by devices or systems that categorize images into one or more particular categories of similarly structured objects. For example, a robot operating within a space may be equipped with one or more cameras to acquire image data of objects the robot may encounter. In many instances, the robot detects the type of object to determine how it is to approach, avoid, or manipulate objects. Embodiments described herein may improve the accuracy of object recognition methods used by such robots (e.g., scale-invariant feature transform, referred to herein as "SIFT") by comparing a confidence score of a preliminary category to a learning threshold, and obtaining supplemental image data corresponding to estimated properties of the target object from a supplemental image collection (e.g., the Internet).

By dynamically gathering more images relating to a particular category (or categories) that the robot is deficient at recognizing, the robot may increase its accuracy in detecting objects within that category over time. Additionally, rather than gathering a significant amount of data across many categories to supplement an image library, embodiments described herein may gather supplemental image data specific to only those categories that the robot is deficient at recognizing, thereby reducing the volume of data that is collected and stored. Although embodiments are described in the context of robots and robotic applications, embodiments are not limited thereto. For example, the methods described herein may be implemented into computer systems tasked with categorizing images. Various embodiments of methods for recognizing a category of an object and robots are described in detail below.

Figure 1A:
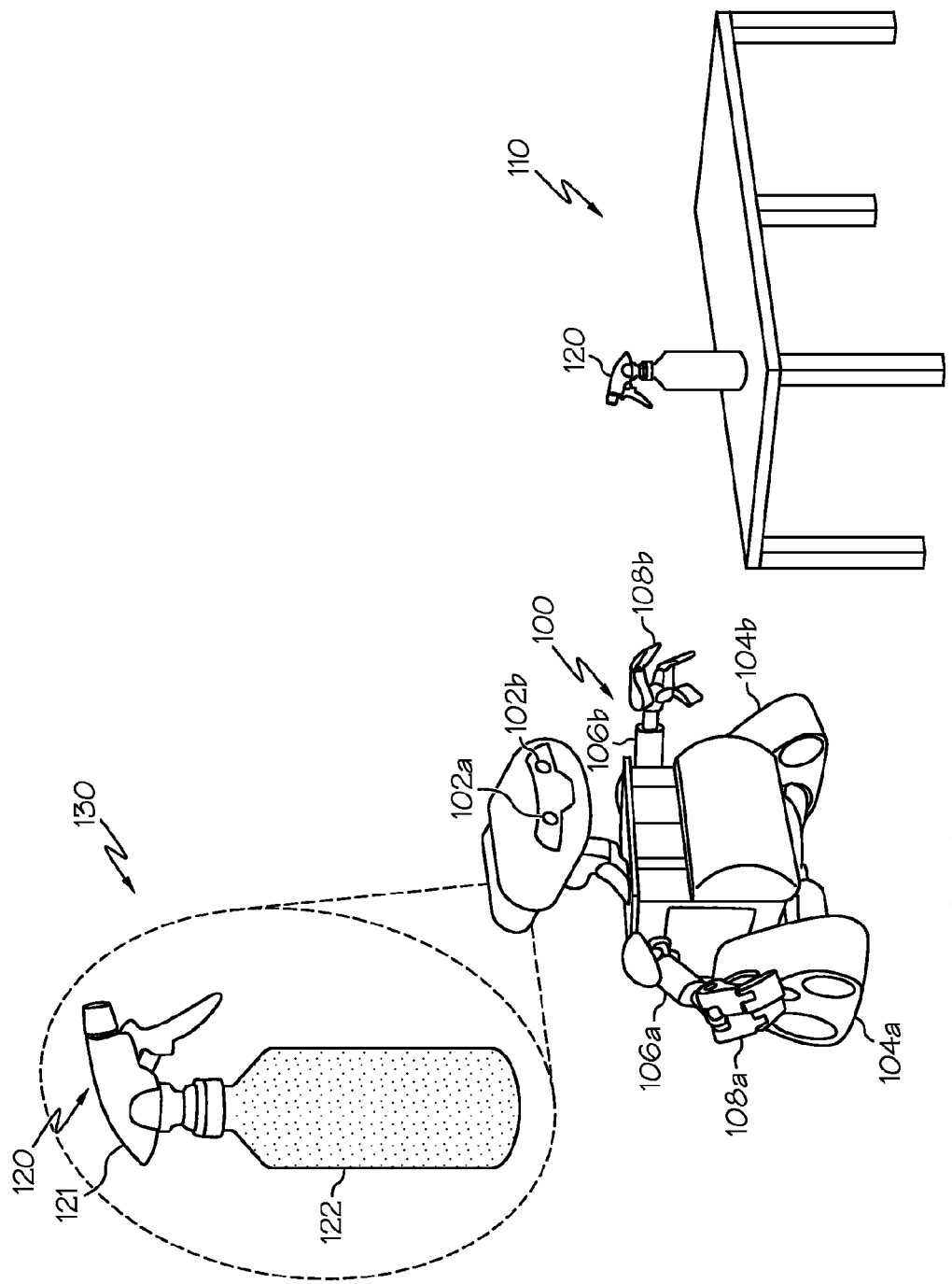
FIG. 1A depicts a schematic illustration of a robot evaluating a target object within an operating space according to one or more embodiments described and illustrated herein.

Referring initially to FIG. 1A, a robot 100 operating within an operating space 110 is illustrated. The robot 100, which is illustrated generically in FIG. 1A, may take on any size and configuration. For example, the robot 100 may be configured as service robot to assist humans in the home, workplace, school, or healthcare facility, such as the robot 100 illustrated in FIG. 1A. In another embodiment, the robot may be a production robot utilized within a manufacturing facility. It should be understood that the embodiments described herein are not limited to any type of robot.

The exemplary robot 100 illustrated in FIG. 1A generally comprises two image capturing devices 102a, 102b, two arms 106a, 106b, two gripping assemblies 108a, 108b, and two locomotion devices 104a, 104b. The locomotion devices 104a, 104b are utilized by the robot 100 to maneuver within the operating space, and are not limited to the tracked locomotion devices 104a, 104b depicted in FIG. 1A. For example, the robot 100 may maneuver within the operating space using one or more wheels or legs. The arms 106a, 106b and gripping assemblies 108a, 108b may be servo-actuated in one embodiment to manipulate objects that the robot 100 encounters within the operating space. Other actuation mechanisms may be utilized, such as by pneumatic drives, hydraulic drives, electro-active polymer motors, etc. The two image capturing devices 102a, 102b may be configured as digital cameras capable of acquiring still image and/or digital video. In an alternative embodiment, the robot 100 may be equipped with only one image capturing device. Two image capturing devices may enable the robot to detect the pose of objects that it encounters within the operating space, as well as the distance of objects from the robot.

Figure 1B:
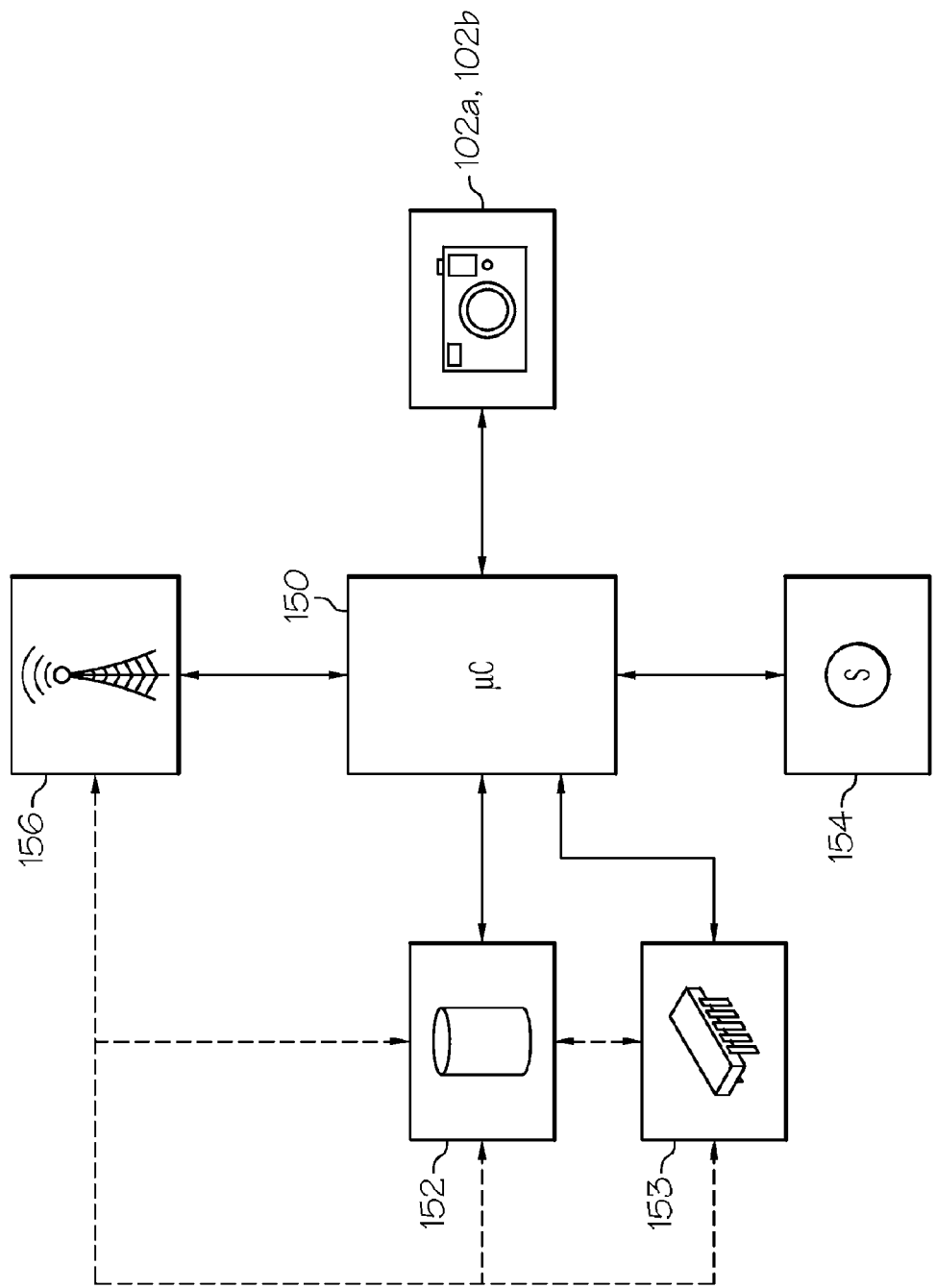
FIG. 1B depicts a schematic illustration of internal components of a robot according to one or more embodiments described and illustrated herein.

Referring now to FIG. 1B, various internal components of the robot 100 are illustrated. The robot 100 may comprise one or more processors 150 configured to carry out the various methods and tasks described hereinbelow. The processor 150 is configured to communicate with electrically coupled components, and may be configured as any commercially available or customized processor suitable for the particular applications that the robot 100 is designed to operate.

As illustrated in FIG. 1B, the processor 150 may be communicatively coupled to the two image capturing devices 102a, 102b, actuator drive hardware 154, a data storage device 152, a non-transitory memory component 153, and a communications module 156. The non-transitory memory component 153 may be configured as volatile and/or nonvolatile computer-readable storage medium and, as such, may include random access memory (including SRAM, DRAM, and/or other types of random access memory), flash memory, registers, compact discs (CD), digital versatile discs (DVD), and/or other types of storage components. Additionally, the non-transitory memory component 153 may be configured to store robot operating logic, including, but not limited to, the set of instructions executed by the processor to carry out the object category recognition methods described herein. Other data may be stored in the non-transitory memory component 153 to provide support for functionalities described herein.

The data storage device 152 may also be configured as volatile and/or nonvolatile computer-readable storage medium, and may be configured to maintain the database 127 (or databases) containing the image library or libraries described herein. In one embodiment, the data storage device 152 is a separate data storage component from the non-transitory memory component 153. In another embodiment, the data storage device 152 and the non-transitory memory component 153 are provided as a single data storage component (i.e., the databases and set of instructions are stored in a single data storage component). In yet another embodiment, the data storage device 152 may be remote from the robot 100, and remotely accessed via the communications module 156.

The actuator drive hardware 154 may comprise the actuators and associated drive electronics to control the locomotion devices 104a, 104b, the arms 106a, 106b, the gripping assemblies 108a, 108b, and any other external robot components that may be present. The actuator drive hardware 154 may be configured to receive control signals from the processor 150 and to operate robot accordingly.

The two image capturing devices 102a, 102b may receive control signals from the processor 150 to acquire image data of target objects, and to then send image data of the target objects to the processor and/or the data storage device 152 for storage and/or processing. The two image capturing devices 102a, 102b may be directly connected to the data storage device 152, or, in an alternative embodiment, include dedicated memory devices (e.g., flash memory) that are accessible to the processor 150 for retrieval.

The communications module 156 may be configured as a wireless communications circuit such that the robot 100 may communicate with external systems and devices. The communications module 156 may be configured to communicate over any type of wireless communications protocol, such as, but not limited to, satellite communication, WiFi, WiMax, cellular (e.g., 3G, 4G, LTE, etc.), and proprietary wireless communication protocol. In the embodiments described herein, the communications module 156 may enable the robot 100 to access the Internet (or other network) to obtain supplemental image data, as described in detail below.

Referring once again to FIG. 1A, the robot 100 may operate within an operating space 110 and encounter a variety of objects. The robot 100 may be commanded or otherwise programmed to retrieve and/or manipulate a particular object, or it may be programmed to autonomously navigate within an operating space and manipulate objects that it encounters at-will. In FIG. 1A, the robot 100 has encountered a spray bottle 120 positioned on top of a coffee table. The robot 100 may be programmed or otherwise instructed to find the spray bottle 120 and manipulate it in some manner. For example, a user operating the robot 100 may have instructed the robot 100 to find the spray bottle 120, pick it up, and bring it back to him or her. In this manner, the spray bottle 120 is the target object of the robot 100. Using the two image capturing devices 102a, 102b, the robot 100 obtains target image data of the spray bottle 120, which is represented by the target object image 130 illustrated in FIG. 1A. The target image data may be in the form of digital video and/or one or more digital photographs.

The robot 100 may be programmed to determine the particular category of the spray bottle 120 before attempting to perform a manipulation thereon. For example, the robot 100 may be instructed to manipulate a different object (e.g., a soda can), and should detect that the spray bottle is not in the same object category as a soda can. Any number of object categories may be provided and stored within the database 127 of the data storage device. As examples and not limitations, object categories may include spray bottle, soda can, coffee mug, pen/pencil, remote control, book, or any other type of object that may be present within the operating space. Each category may comprise a plurality of images of objects stored in an image library of that particular category. For example, the spray bottle category may comprise an image library comprising several digital images of various spray bottles. In another embodiment, the image library may only contain extracted features (e.g., features extracted by SIFT or other feature extraction object recognition method) of digital images of the objects rather than the entire digital image.

Figure 2:
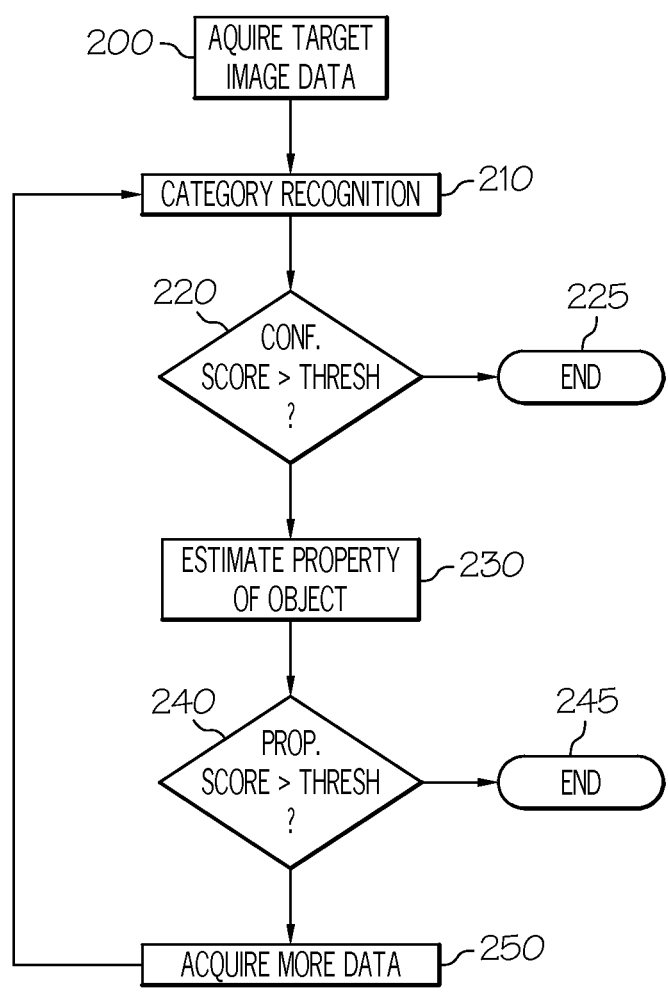
FIG. 2 depicts a flowchart of a method of acquiring supplemental image data for recognizing a category of an object according to one or more embodiments described and illustrated herein.

Referring now to FIG. 2, a flow chart of a method of recognizing a category of an object according to one embodiment is illustrated. At block 200, the robot 100 acquires target image data, as described above. Using the example of FIG. 1A, the target object may be a spray bottle 120. Next, the robot 100 may attempt to recognize the category of the target object at block 210. The robot 100 may be programmed to utilize one or more different category recognition algorithms. Any object recognition algorithm that outputs a confidence score pertaining to the confidence that the correct category (or type of object) of the target object has been selected may be utilized by the embodiments described herein. For example, the confidence score may be a percentage (e.g., the object recognition algorithm is 70% confident that the correct object category has been selected), a number within a scale, etc. Exemplary object recognition algorithms may include, but are not limited to, SIFT, speeded up robust features ("SURF"), PCA-SIFT, GLOW, Canny edge detection, and others. Embodiments of the present application are described in the context of SIFT; however, other object recognition methods may be used.

An image library for each designated category (e.g., spray bottle, soda can, coffee mug, etc.) is stored within the database 127 (or databases) or other memory locations. The image library for a particular object category may comprise several images of objects for that particular category. For example, the image library associated with the spray bottle category may contain several images of spray bottles. These images may be used as reference images (i.e., training images) for the application of SIFT to detect the category of target objects. Features may be extracted from the reference images by SIFT and stored in the associated image library (or other location within the database 127) to be compared with target image data of target objects for object recognition.

At block 210, features may be extracted from the target image data and compared to the extracted features of the reference images using SIFT. More specifically, as taught in U.S. Pat. No. 6,711,293, SIFT may correlate the extracted scale invariant features of the target image data with those extracted scale invariant features of the reference images, and indicate a category of the target object when a sufficient number of target object scale invariant features define an aggregate degree of correlation exceeding a threshold correlation with reference image scale invariant features. If the degree of matching is high, then it is likely that the target object should be classified within the object category. A confidence score may be generated based on the degree of matching generated by SIFT. The category having the highest confidence score, and thereby the highest degree of matching, may be selected as the preliminary category associated within the target object.

At block 220, the confidence score generated at block 210 is compared to a learning threshold. The learning threshold also represents the confidence in which the robot has that the preliminary category is the correct category of the target object. In one embodiment, the learning threshold is greater than the SIFT threshold correlation. In another embodiment, the learning threshold is equal to the SIFT threshold correlation, and the object category having the highest confidence score is selected as the preliminary category even though it does not meet the SIFT threshold correlation. If the confidence score is greater than the learning threshold, the preliminary category is selected as the object category of the target object and the object recognition method ends at block 225. After confirming the object category of the target object, the robot 100 may perform manipulations on the target object accordingly.

If the confidence score is less than the learning threshold at block 220, then the robot is not confident that the preliminary category is the correct object category of the target object and the process moves to block 230. As described below, when the robot is not confident that the preliminary category is the correct object category, the robot may search for supplemental image data and store such supplemental image data in the image library or libraries for future use to increase the efficiency and accuracy of future target object recognitions. In one embodiment, supplemental image data relating to only properties of the target object in which the robot is confident is searched for and stored. For example, it may not be efficient to search for supplemental image data for properties of the target object of which the robot is not certain. Properties of the target object may include, but are not limited to, color of the target object, the pose of the target object (i.e., the orientation of the target object), the size of the target object, the shape of the target object, and markings on the target object (e.g., lettering or logos).

At block 230, properties of the target object are estimated and assigned a property score. As an example and not a limitation, to estimate a target object color property, the robot may evaluate the red value, green value and blue value each pixel (or sub-groups of pixels) in the target image data and calculate an average color value of the object. For example, if the target object is primarily orange, most of the pixels of the target object will be orange and the robot may determine that the target object is orange and assign the color property of the target object with a property score that is relatively high. If the color of the object is ambiguous (e.g., there are many colors associated with the object, or the lighting within the operating space makes it difficult for the robot to determine color), the property score of the color property assigned to the target object may be relatively low. It should be understood that any color estimation method may be used to estimate the color of the target object. Additionally, various methods for detecting the other properties of the target may also be utilized. For example, the pose of the target object may be detected using known or yet-to-be-developed three-dimensional pose estimation algorithms. The pose may be estimated using a single two-dimensional target object image, or it may be estimated using stereo target object images produced by the two image capturing devices 102a, 102b. The object pose property may also be estimated using SIFT. Any number of algorithms may be used to detect the pose of the target object and assign a property score indicating a degree of confidence as to the detected pose.

At block 240, the property score of one or more of the estimated properties are compared with an estimated property threshold associated with the object property to determine whether or not the robot is confident as to the estimated property or properties. In one embodiment, the estimated property threshold is the same for each type of object property (e.g., color property, object pose property, object size property, etc.) such that the estimated property scores are normalized. In another embodiment, the estimated property threshold is different for each type of object property.

If the property score for an estimated property is not greater than an estimated property threshold, then the process may end for that particular estimated property at block 245. For example, the robot may not be confident that the target object is a particular color or oriented in a particular pose. Therefore, the robot may not search for supplemental image data having an estimated property for which it has low confidence.

If the property score for an estimated property is greater than the property threshold, then the robot may acquire supplemental image data with images of objects of the preliminary category and having the estimated property (or properties) at block 250. A supplemental image collection may be searched for supplemental image data using the preliminary category and the one or more estimated properties as search criteria. In one embodiment, the supplemental image collection includes a database that stores a plurality of images. In another embodiment, the supplemental image collection includes a plurality of images stored over a plurality of databases and/or computer devices. For example, the supplemental image collection may be the Internet and the images linked or stored therein.

In one embodiment, the supplemental image collection comprises the Internet, and the robot searches the Internet using a search query and an Internet search engine, such a Google, Bing, Yahoo! and the like. The robot may be programmed to generate a search query based on the preliminary category and one or more estimated properties for which the robot has a high confidence. For example, if the robot determines that the preliminary category of the target object is a pen, and the estimated color property of the target object is brown, then the robot may generate an Internet search query for images of pens that are brown. Likewise, if the robot determines that the target object is oriented at a particular angle, the robot may search for images of pens and then perform a pose detection of the pens depicted in the returned images, and select those images that meet the estimated pose of the target object. The retrieved images may be supplemental image data that is then stored within the appropriate image library. Features may be extracted from the supplemental image data (i.e., a set of supplemental image data features) using SIFT and also stored in the image library.

In one embodiment, the robot may again attempt to recognize the category of the target object for which it had acquired supplemental image data, returning to block 210. In another embodiment, the robot may not re-attempt to recognize the target object but select the preliminary category as the object category and attempt to manipulate the target object. The supplemental image data may be used by the robot during future object category recognition sessions.

Figure 3:
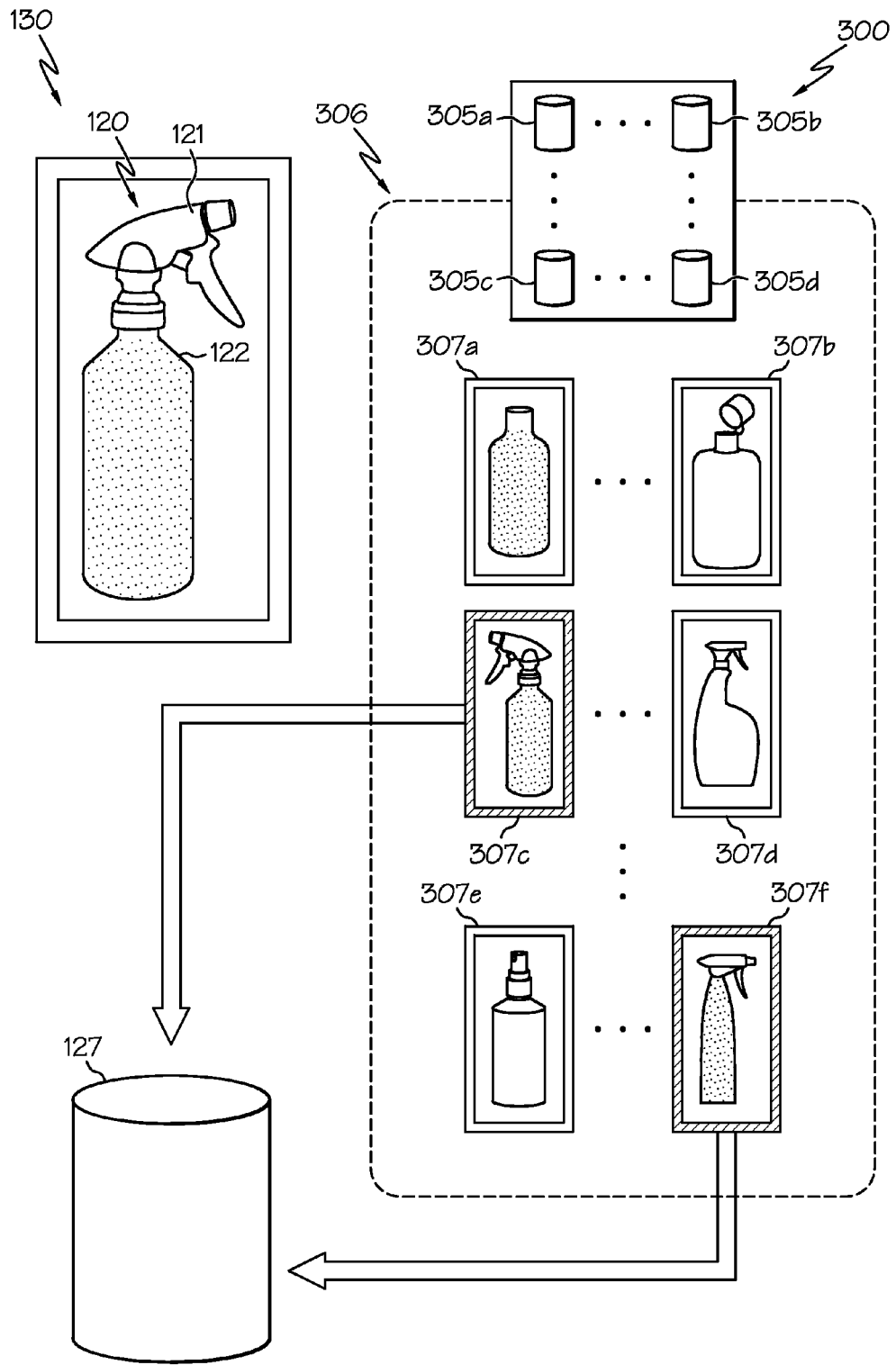
FIG. 3 depicts a schematic illustration of searching for supplemental image data relating to a preliminary object category and a color property according to one or more embodiments described and illustrated herein.

Referring now to FIG. 3, an example of searching a supplemental image collection 300 for an orange spray bottle is schematically illustrated. In this embodiment, the supplemental image collection 300 is the Internet, which comprises a plurality of linked databases or networked data storage devices 305a-305d containing images. For example, the data storage devices 305a-305d may store web pages containing images, or the data storage devices 305a-305d may locally store a plurality of images. As an example and not a limitation, the data storage device(s) may contain web pages of an Internet retailer having searchable images of products that are for sale. These images may be searched by the robot 100 to obtain the supplemental image data.

The target object image 130 represents the spray bottle 120 illustrated in FIG. 1A. The spray bottle 120 has a sprayer portion 121 and a bottle portion 122. In this example, the bottle portion 122 has an orange color, which is illustrated by the dot hatch pattern. The robot 100 may detect that the target object image 130 should be categorized as a spray bottle, but it may be uncertain because the confidence score may be below the learning threshold. To bolster its object category recognition capabilities for spray bottles, the robot 100 may search for supplemental image data regarding spray bottles having properties of the target spray bottle 120 for which the robot is certain. For example, the robot may have estimated the object color property of the spray bottle 120 to be orange with a high property score (e.g., a 7.2 on a scale of 0 to 10), thereby indicating that the robot 100 is certain that the target object is orange.

The robot 100 may then attempt to acquire supplemental image data of objects in the spray bottle category from a supplemental image collection, which in this example is defined by the Internet. The robot 100 may generate a search query based on the preliminary category (spray bottle) and the estimated property (orange) that may be inputted into a search engine to return image results. In one embodiment, the robot 100 is connected to the Internet through the communications module 156 (FIG. 1A). As an example, the robot 100 may send the search query "orange spray bottle" to the Google search engine to perform an image search. The robot 100 may be configured to retrieve a certain number of potential reference images 307a-307f in a search result 306 that may be selected by the robot as supplemental image data. In one embodiment, the robot 100 may perform a color estimation on the reference images to confirm the color, as well as object recognition (e.g., by SIFT) to confirm that the image is a spray bottle with some degree of certainty.

As indicated in FIG. 3, the robot 100 may select those reference images depicting an orange spray bottle. In this example, reference images 307c and 307f have been selected as supplemental image data and stored within the image library in the database 127. This supplemental image data may then be utilized by the robot in future object category recognition sessions.

Figure 4:
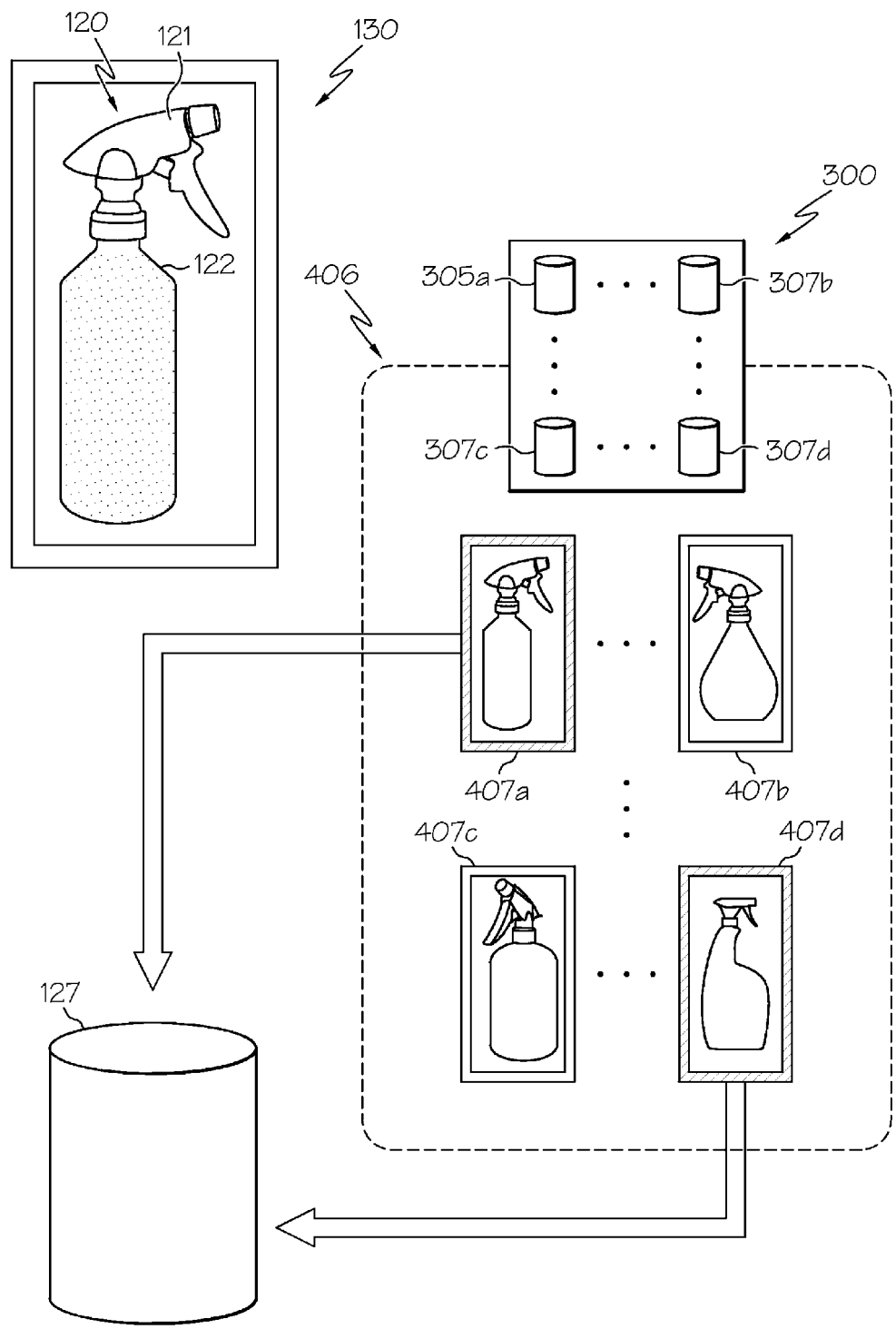
FIG. 4 depicts a schematic illustration of searching for supplemental image data relating to a preliminary object category and an object pose property according to one or more embodiments described and illustrated herein.

Referring now to FIG. 4, an example of searching a supplemental image collection 300 for a spray bottle having a particular pose is schematically illustrated. As described above, the supplemental image collection is defined by the Internet and the target object image 130 represents the spray bottle 120 illustrated in FIG. 1A. The robot 100 may detect that the target object 120 should be categorized as a spray bottle, but it may be uncertain. However, the robot may be certain as to the pose of the spray bottle, which may be oriented at ten degrees, for example. The robot may therefore assign a relatively high property score to the object pose property (e.g., 6.8 on a scale of 0 to 10). The robot may then search the supplemental image collection for spray bottles orientated at ten degrees or within a particular range surrounding ten degrees. The range may depend on the desired degree of accuracy. As an example and not a limitation, the robot 100 may send the search query "spray bottle" to the Google search engine (or similar) to perform an image search regarding spray bottles. The robot 100 may be configured to retrieve a certain number of potential reference images 407a-407f in a search result 406 that may be selected by the robot as supplemental image data. In one embodiment, the robot 100 performs a pose estimation on the images to estimate the pose of the spray bottle, as well as an object recognition to confirm that the image is a spray bottle with some degree of certainty. The robot 100 may then select those reference images that depict a spray bottle oriented at ten degrees, or within some range of ten degrees. In the illustrated embodiment, reference images 407a and 407d meet these criteria and are selected as supplemental image data that is stored in the image library or libraries within the database 127.

The supplemental image collection may be search using one estimated property at a time (e.g., only color) or multiple estimated properties at once (e.g., color and pose). As an example and not a limitation, the robot 100 may be programmed to select not only orange spray bottles, but also spray bottles that are oriented at a particular angle, in a single search.

It should now be understood that the embodiments described herein may provide for accurate and efficient object category recognition by dynamically supplementing an image library with supplemental image data for object categories where the robot (or device or system) is deficient at recognizing. Embodiments described herein may allow the robot to store image data relevant to properties of the target object that it detects with a high degree of confidence, thereby preventing irrelevant and unnecessary images from being searched, processed, and/or stored. This may reduce processing and data storage requirements. The supplemental image data may then be used by the robot to detect the category of target objects with greater efficiency and accuracy.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A method for recognizing a category of an object, the method comprising:
    calculating a confidence score for a plurality of categories;
    determining, by a processor, a preliminary category of a target object, wherein a highest confidence score is associated with the preliminary category;
    comparing the highest confidence score to a learning threshold;
    if the highest confidence score is less than the learning threshold, estimating properties of the target object and generating a property score for one or more estimated properties of the target object, wherein the property score is different from the confidence score; and
    searching a supplemental image collection for supplemental image data using the preliminary category and the one or more estimated properties.

2. The method of claim 1, wherein the preliminary category of the target object and the highest confidence score is determined by:
    obtaining target image data of the target object;
    extracting, by a computer, a set of features from the target image data;
    comparing the extracted set of features to library features associated with the plurality of categories of an image library stored in a database; and
    selecting a category having the highest confidence score as the preliminary category of the target object.

3. The method of claim 2, further comprising supplementing the image library with retrieved supplemental image data.

4. The method of claim 3, further comprising determining the preliminary category of the target object using the image library containing the retrieved supplemental image data.

5. The method of claim 3, further comprising extracting a set of supplemental image data features from the retrieved supplemental image data.

6. The method of claim 1, wherein the preliminary category of the target object and the confidence score is determined by a scale-invariant feature transform process.

7. The method of claim 6, wherein the confidence score comprises a degree of correlation resulting from the scale-invariant feature transform process.

8. The method of claim 1, wherein the one or more estimated properties comprise one or more of a color property or an object pose property.

9. The method of claim 8, wherein the color property is estimated by evaluating a red value, a green value, and a blue value of individual ones of a plurality of pixels of the target image data, and the color property is an average color of the plurality of pixels.

10. The method of claim 8, wherein the object pose property is determined by a scale-invariant feature transform process.

11. The method of claim 1, wherein the supplemental image collection is searched by:
    generating a search query based at least in part on the preliminary category and the one or more estimated properties having a property score that is greater than an estimated property threshold; and
    searching the supplemental image collection for supplemental image data using the search query.

12. The method of claim 1, wherein the supplemental image collection is defined by a network comprising a plurality of linked databases.

13. A method for recognizing a category of an object, the method comprising:
    determining, by a processor, a preliminary category of a target object and a confidence score associated with the preliminary category, the preliminary category and the confidence score determined by:
        obtaining target image data of the target object;
        extracting, by the processor, a set of features from the target image data;
        comparing the extracted set of features to library features associated with a plurality of categories of an image library stored in a database, and generating the confidence score for one or more categories of the plurality of categories; and
        selecting the category having a highest confidence score as the preliminary category of the target object;
    comparing the confidence score to a learning threshold; and
    if the highest confidence score is less than the learning threshold:

estimating properties of the target object and generating a property score for one or more estimated properties;

comparing the property score for the one or more estimated properties with an estimated property threshold;

generating a search query based at least in part on the preliminary category and the one or more estimated properties having a property score that is greater than the estimated property threshold;

searching the supplemental image collection for supplemental image data using the search query; and supplementing the image library with retrieved supplemental image data.

14. The method of claim 13, wherein the preliminary category of the target object and the confidence score is determined by a scale-invariant feature transform process.

15. The method of claim 14, wherein the confidence score comprises a degree of correlation resulting from the scale-invariant feature transform process.

16. The method of claim 13, wherein the one or more estimated properties comprise one or more of a color property or an object pose property.

17. The method of claim 16, wherein the color property is estimated by evaluating a red value, a green value, and a blue value of individual ones of a plurality of pixels of the target image data and the color property is a color associated with color property is an average color of the plurality of pixels.

18. A robot comprising:
an image capturing device;
a processor;
a computer-readable storage medium comprising instructions that, when executed by the processor, causes the processor to:
control the image capturing device to acquire target image data of a target object;
calculate a confidence score for a plurality of categories;
determine a preliminary category of the target object, wherein a highest confidence score is associated with the preliminary category;
compare the confidence score to a learning threshold;
if the highest confidence score is less than the learning threshold:
estimate properties of the target object and generate a property score for one or more estimated properties of the target object wherein the property score is different from the confidence score; and
retrieve supplemental image data from a supplemental image collection using the preliminary category and the one or more estimated properties as search criteria.

19. The robot of claim 18, wherein the preliminary category of the target object and the highest confidence score is determined by:
obtaining target image data of the target object;
extracting a set of features from the target image data;
comparing the extracted set of features to library features associated with the plurality of categories of an image library stored in a database that is accessible by the processor; and
selecting a category having the highest confidence score as the preliminary category of the target object.

20. The robot of claim 18, wherein the set of instructions further cause the processor to generate a search query based at least in part on the preliminary category and the one or more estimated properties having a property score that is greater than an estimated property threshold, and search the supplemental image collection for supplemental image data using the search query.

* * * * *